US008265970B2

(12) United States Patent  
Conroy et al.

(10) Patent No.: US 8,265,970 B2  
(45) Date of Patent: Sep. 11, 2012

(54) SYSTEMS AND METHODS FOR MANAGING BUSINESS PROCESSES IN AN ENTERPRISE

(75) Inventors: Patrick Michael Conroy, Erie, CO (US); Jay Miller, Lafayette, CO (US); Edward C. Ericson, Boulder, CO (US); Steven Rdzak, Arvada, CO (US); John Andrew Huth, Littleton, CO (US); Chris Swift, Boulder, CO (US); Douglas E. Naufel, Broken Arrow, OK (US)

(73) Assignee: Level 3 Communications, LLC, Broomfield, CO (US)

( * ) Notice: Subject to any disclaimer, the term of this patent is extended or adjusted under 35 U.S.C. 154(b) by 1464 days.

(21) Appl. No.: 11/760,628

(22) Filed: Jun. 8, 2007

(65) Prior Publication Data

US 2008/0306751 A1    Dec. 11, 2008

(51) Int. Cl.
*G06F 10/00* (2006.01)
(52) U.S. Cl. .................................. 705/7.11
(58) Field of Classification Search .............. 705/7, 7.11
See application file for complete search history.

(56) References Cited

U.S. PATENT DOCUMENTS

| | | | | |
|---|---|---|---|---|
| 5,991,806 | A * | 11/1999 | McHann, Jr. | 709/224 |
| 7,221,377 | B1 * | 5/2007 | Okita et al. | 345/629 |
| 7,313,533 | B2 * | 12/2007 | Chang et al. | 705/7 |
| 7,626,982 | B2 * | 12/2009 | Akadiri | 370/362 |

OTHER PUBLICATIONS

Donald et al (Enterprise Business Process Management—Architecture, Technology Standards), Dec. 2006, Springler-Verlag Berlin Heideberg, pp. 1-15.*
Jung et al (Business Process Choreography for B2B Collaboration), Jan. 2004, IEEE Internet Computing, pp. 1-9.*
Bayne (Automation and Control in Large-Scale Interactive Systems), Dec. 2002, Proceedings of the Fifth International Symposium on Object Oriented Real-Time Distributed, pp. 1-8.*
Ebiefung (Production Equilibrium Point in Multi-Unit Manufacturing Systems and the Vertical Linear Complementarity Problem), Dec. 2003, Department of Mathematics, University of Tennessee at Chattanooga, pp. 1-10.*

* cited by examiner

*Primary Examiner* — Romain Jeanty  
(74) *Attorney, Agent, or Firm* — John C. Heuton

(57) ABSTRACT

A method for managing a business process in an enterprise includes executing a business process model, wherein executing the business process model comprises generating a plurality of business level messages associated with business level tasks, generating one or more system level messages associated with system level tasks to be performed by one or more enterprise subsystems, wherein the one or more system level messages are in a common format that is accessible by the one or more enterprise subsystems, and broadcasting the one or more system level messages over a communication channel communicably coupling the plurality of enterprise subsystems. A system includes a communication channel carrying system level messages in a generic format, a plurality of business subsystems communicably coupled to the communication channel, adapters operable to translate messages from the generic format into associated business subsystem specific formats and vice versa.

20 Claims, 6 Drawing Sheets

SYSTEMS AND METHODS FOR MANAGING BUSINESS PROCESSES IN AN ENTERPRISE

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2007 Level 3 Communications, LLC.

TECHNICAL FIELD

Embodiments of the present invention generally relate to systems and methods for managing business processes within an enterprise. More specifically, embodiments relate to a common platform enabling coordinated communication among multiple subsystems in the enterprise engaged in carrying out a business process.

BACKGROUND

Large projects involving many people and/or groups who facilitate different aspects of the project are preferably managed and organized so that the project yields the requested results as efficiently and inexpensively as possible. For example, in the field of network telecommunications, when a client orders network service from a network service provider, delivering the network infrastructure and service is typically a very involved and complex process over the life of the project. Prior systems for managing large projects, such as network service provisioning, often have drawbacks related to inefficiency and redundancy.

Large projects can span many months or even years, and can involve many different tasks and groups. In such large projects it can be very difficult for upper level management to obtain a view of the status of the entire project at any given point in time. Some companies use work flow engines to manage projects. Work flow engines typically automate the flow of paperwork from person to person involved in the project, task management via documents, and so on. Although work flow engines have been fairly effective in facilitating the project tasks, these systems have historically required a great deal of software and the deep involvement of the information technology group within the organization. For example, specialized code would need to be developed to track the various steps in the workflow. When the workflow changed, the code would need to be changed. In industries where time is critical, the need to update code when any change to work flow arises is a great burden.

In implementing long term projects companies need to be able to respond quickly to changing circumstances. For example, when a network service provider implements a new private line network to a business client, changes may occur at various times in the project that impact various departments of the network service provider. In this example, the changes may occur due to changes in client requirements or changes in assumptions, such as component availability or worksite geography or zoning. Some of these changes could dictate that previously done work must be redone, or previously made preparations must be reassessed. For example, new types of components may need to be ordered or the network may need to be rerouted. Such changes may affect many aspects of the project, such as order entry, billing, inventory management, or engineering. At a minimum the network service provider must be able to quickly determine whether the changes can be made at all; e.g., it may be too late in the process to reroute the network. If the changes can be made, the company should be able to quickly determine new costs, if any, tasks to be reworked, possible changes to downstream requirements, and so on.

It is with respect to the foregoing and other problems that embodiments of the present invention have been created.

SUMMARY

Embodiments of the present invention relate to systems and methods for managing a business process of an enterprise. More specifically, embodiments provide a common communication and management platform including a communication channel communicably coupling multiple business subsystems, a business process management system (BPMS) and a communication channel management system. In these embodiments a common language is used across the communication channel. The BPMS transmits messages over the communication channel. Business subsystems may subscribe to messages of a specified type or relating to specified subjects.

An embodiment of a method for managing a business process in an enterprise includes executing a business process model, wherein executing the business process model comprises generating a plurality of business level messages associated with business level tasks. In response to receiving a business level message, one or more system level messages are generated that are associated with system level tasks to be performed by one or more enterprise subsystems, wherein the one or more system level messages are in a common format that is accessible by the one or more enterprise subsystems. The method may further include broadcasting the one or more system level messages over a communication channel communicably coupling the plurality of enterprise subsystems.

The communication channel may be part of an Enterprise Service Bus (ESB). The method may further include accepting subscriptions from the plurality of subsystems to subscribe to system level messages related to selected subjects. Still further, the method may include translating the one or more system level messages from the common format into a format that is specific to one of the plurality of subsystems. The method may further include editing the business process model based on performance or nonperformance of tasks specified by the one or more system level messages. The method may further include designing the business process model by specifying a plurality of rules and at least one workflow. The common format may be a canonical format.

Still further, the plurality of business level messages may be generated by a business process model system (BPMS), and wherein generating the one or more system level messages is performed by an enterprise service bus (ESB). The method may further include translating one or more system level messages from associated subsystem specific formats into the common format, and transmitting the one or more system level messages in the common format from the subsystems onto the communication channel. Further still, the method may involve monitoring the communication channel for system level messages from the subsystems to analyze the business process.

An embodiment of a system includes a communication channel carrying system level messages in a generic format, a plurality of business subsystems communicably coupled to the communication channel, wherein each business subsystem generates system level messages in a business subsystem specific format, and a plurality of adapters, wherein each adapter is associated with one of the plurality of business subsystems, and wherein each adapter is operable to translate messages from the generic format into the associated business subsystem specific format and vice versa. The system further includes a business process management subsystem communicably coupled to the communication channel and operable to execute a business process model to manage the plurality of business subsystems.

The communication channel may include one or more of an Ethernet (IEEE 802.3) network and a Wi-Fi (IEEE 802.11) network. The system may further include a communication channel management subsystem configured to manage communications over the communication channel. The communication channel and the communication channel management subsystem may form an Enterprise Service Bus (ESB). In one embodiment, the communication channel management subsystem maintains subscriptions associated with the business subsystems. The communication channel management subsystem may receive business level messages from the business process management subsystem and responsively broadcast one or more system level messages onto the communication channel in the generic format, whereby subscribing subsystems can receive the one or more system level messages related to subjects to which the subsystems subscribe.

Still further, each of the plurality of adapter modules may be selected from a group consisting of an appliance, a server computer; and a gateway. Messages in the generic format may be in a canonical format. The canonical format may include a subject field specifying the subject associated with the message, a sender field specifying the sender of the message, a verb field specifying an action to be taken with respect to the subject, and a plurality of attribute fields related to the subject and the verb. The plurality of business subsystems comprise one or more of a human resources subsystem, an accounting subsystem, an engineering subsystem, a customer relations management subsystem, an inventory management subsystem, and a billing subsystem.

Figure 1:
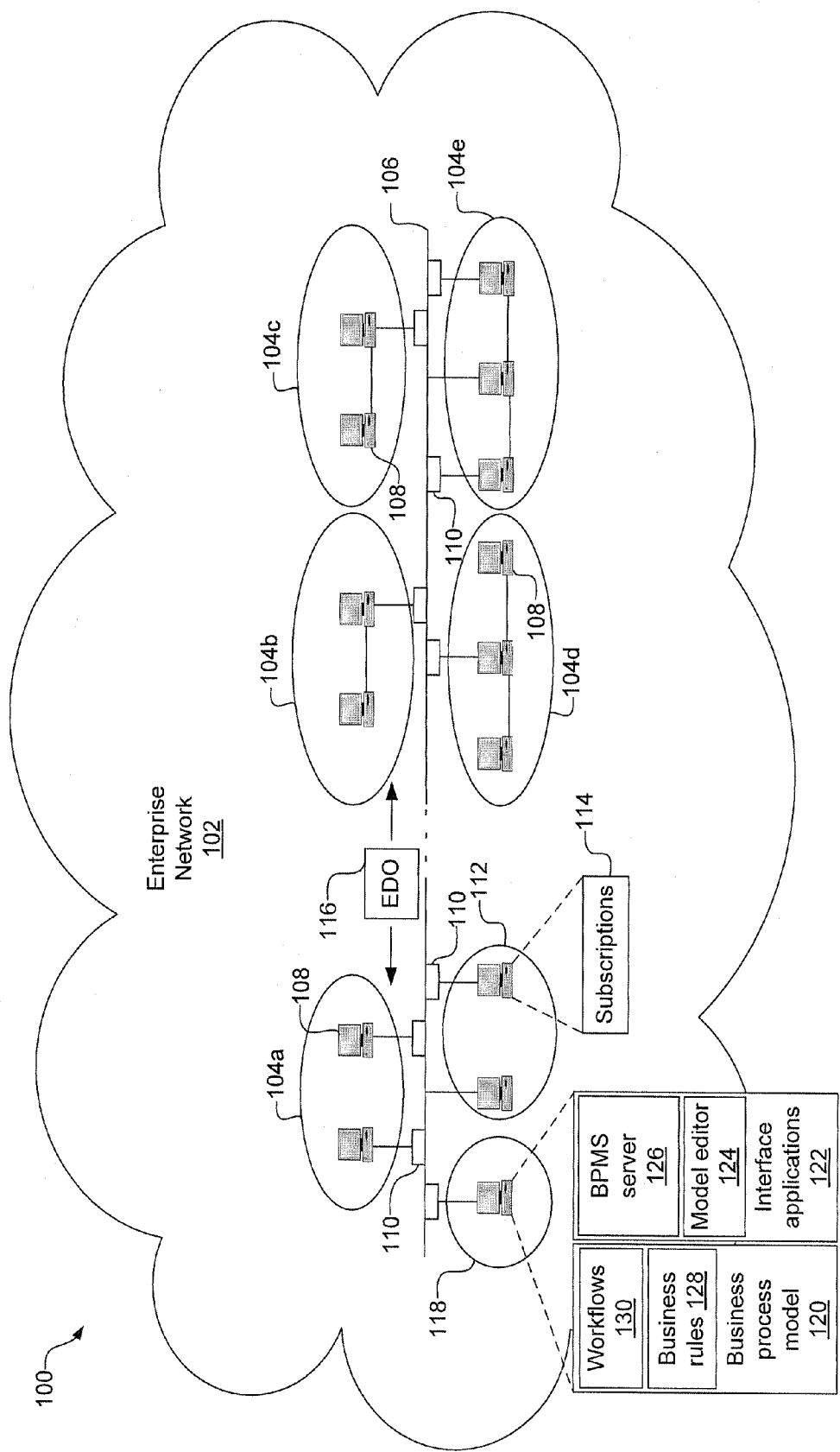
FIG. 1 illustrates an operating environment suitable for practicing embodiments of the present invention.

While the invention is amenable to various modifications and alternative forms, specific embodiments have been shown by way of example in the drawings and are described in detail below. The intention, however, is not to limit the invention to the particular embodiments described.

DETAILED DESCRIPTION

Embodiments of the present invention relate to systems and methods for managing a business process of an enterprise. More specifically, embodiments provide a common communication and management platform including a communication channel communicably coupling multiple business subsystems, a business process management system (BPMS) and a communication channel management system. In these embodiments a common language is used across the communication channel. The BPMS transmits messages over the communication channel. Business subsystems may subscribe to messages of a specified type or relating to specified subjects.

In some embodiments the BPMS executes a business process model representative of the business process. In executing the business process model, business level messages may be broadcast over the communication channel. As such, the BPMS does not need to perform a point-to-point process of managing various subsystems. The BPMS can broadcast messages to all subsystems and wait for appropriate responses from the relevant subsystems. Typically, the BPMS logs the time of responses from the subsystems. A response from a subsystem typically triggers the next step in the process. The times of responses can be used in generating reports. For example, the BPMS may mark the time each reply is received for tracking process metrics. In some embodiments the BPMS simply ignores the payload of the messages from subsystems. In some embodiments the message payload may or may not be included in reports.

In various embodiments, business process responsibilities are split between a BPMS and a common communication platform, such as an ESB. In these embodiments, higher level business messages are generated by the BPMS while system level messages are generated by the ESB. For example, the BPMS may issue one or more business level messages and a server that manages the ESB may issue one or more system level messages in response to each business level message from the BPMS. The ESB management server typically includes a model that indicates tasks to be performed by subsystems in order to carry out a particular business level task. The system level messages may relate to one or more of the subsystems, indicating what task(s) should be performed by the subsystems. The system level messages are transmitted over the ESB and may be received by one or more subsystems.

In some embodiments adapters are logically positioned between the business subsystems and the communication channel. The adapters translate messages from the common format to a subsystem specific format, and vice versa. One or more adapters may be associated with each subsystem. In one embodiment the common message format is Extensible Markup Language (XML). In addition, each adapter is operable to communicate with the application programming interface (API) of the business application of the particular business subsystem which the adapter is associated with.

Some business process management systems use only BPMS or ESB, but not both. These systems are often not ideal because BPMS and ESB are each adapted to different aspects of a business process. BPMS is typically suited for implementing and managing high level business processes, whereas ESB is typically more suited for managing lower level system implementation and communication between subsystems over a bus. Some embodiments described herein employ a BPMS for managing high level business processes and a communication channel manager (e.g., ESB) for managing or coordinating lower-level subsystem operation. In this way, the BPMS does not need to be mired in details of each enterprise subsystem. Rather, the ESB is operable to generate subsystem level tasks that are necessary in carrying out a business level task identified by the BPMS. Furthermore, adapters associated with the subsystems provide for another layer of abstraction so that the BPMS and the ESB do not need to have the ability to communicate with each subsystem in the subsystem's native language.

Some known systems utilize a centralized broker for translating subsystem messages. These systems may be referred to as Enterprise Application Integration. In such systems, enterprise subsystem messages are directed to the broker which determines which language the message should be translated into, performs the translation, and then sends the translated message on to the destination subsystem. The broker therefore must be capable of translating from each subsystem's language to every other subsystem's language. If another subsystem is added to the enterprise, a new translation capability must be added to the broker for every subsystem in the enterprise. Thus, the addition of another subsystem requires an "n-fold" increase in the number of translation functions that need to be performed. The broker must be capable of translating from every existing subsystem language to the new subsystem language and vice versa.

In embodiments described here, there is no "n-fold" increase problem when a new subsystem is added. Because each subsystem has its own adapter, the adapter is configured to translate from one common format to the subsystem's specific format, and vice versa. Each adapter is capable of reading the messages in the common format from the bus, regardless of which subsystem generated the messages. The common format for the system messages on the bus enables each subsystem to choose which messages it wants to read. Any message is accessible by the adapters. Messages can be read by enterprise subsystems in a general fashion or in an ad-hoc fashion.

Prior to describing one or more preferred embodiments of the present invention, definitions of some terms used throughout the description are presented.

DEFINITIONS

If something relates to the "business level", it relates to a business process to be carried out by functional business groups in one or more enterprises. For example, a business level message may correspond to a high-level task or operation that needs to be performed in order to accomplish a step in a business process model. Business level messages may pertain to humans (e.g., employees) or systems in the enterprise.

The term "system level" relates to lower-level tasks that are to be performed by enterprise subsystems in order to accomplish, at least in part, a higher-level business task. One or more system level tasks may be performed for each business level task. For example, a business level task may involve implementing a system, which may require system level tasks of, for example, ordering of parts, billing a client, and/or updating accounting information.

An "enterprise" is an organization engaged in some process. The organization may be for-profit, such as corporation, or nonprofit, such as a government entity.

A "subsystem" or "business subsystem" of an enterprise is a logical functional entity engaged in a business process of the enterprise. A subsystem may be, for example, a group, a department or a business site.

A "business process" is a process carried out by an enterprise for some purpose. The business process may or may not be commercial or industrial.

A "module" is a self-contained functional component. A module may be implemented in hardware, software, firmware, or any combination thereof.

The terms "connected" or "coupled" and related terms are used in an operational sense and are not necessarily limited to a direct connection or coupling.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

If the specification states a component or feature "may", "can", "could", or "might" be included or have a characteristic, that particular component or feature is not required to be included or have the characteristic.

The terms "responsive" and "in response to" includes completely or partially responsive.

The term "computer-readable media" is media that is accessible by a computer, and can include, without limitation, computer storage media and communications media. Computer storage media generally refers to any type of computer-readable memory, such as, but not limited to, volatile, non-volatile, removable, or non-removable memory. Communication media refers to a modulated signal carrying computer-readable data, such as, without limitation, program modules, instructions, or data structures.

Exemplary System

FIG. 1 illustrates an exemplary operating environment 100 for implementing and using a business process management system (BPMS) in accordance with various embodiments of the present invention. The operating environment 100 includes a communication network 102 providing communication among multiple business subsystems 104 within an enterprise. The business subsystems 104 communicate to each other over a communication channel 106 within the network 102 to carry out one or more business processes. Communications transmitted over the communication channel 106 are formatted according to a common language that is generic to the multiple subsystems 104, even though within each subsystem 104 a language may be used that is specific to the subsystem 104.

Exemplary subsystems include, but are not limited to, an accounting subsystem 104a, a billing subsystem 104b, a sales and/or order entry subsystem 104c (customer relations management (CRM) system), a network inventory management subsystem 104d, and a human resources subsystem 104e. The subsystems 104 may be geographically distributed at multiple physical locations or sites, or the subsystems 104 may be commonly located at one physical site. For example, a large enterprise may have human resources subsystem 104e located in one state or country and one or more of the other subsystems located in another state or country. As such, the network 102 and the communication channel 106 may or may not be geographically distributed among multiple locations.

The subsystems 104 include multiple employees (or contractors) and computing systems or devices 108 for carrying out tasks associated with the subsystems 104. The computing systems 108 typically include applications and data related to the tasks and activities of the associated subsystem. For example, the accounting subsystem 104a may include a number of accountants and staff, along with computers 108 executing accounting software to manage the accounts of the enterprise throughout a business process. The types of computing devices in a subsystem 104 can include, for example, server computers, desktop computers, terminals, laptop computers, handheld computers, cell phones or any combination thereof.

With further regard to application programs that may be used by the subsystems 104, as just one example the accounting subsystem 104a may use Financial Applications from Oracle™. As another example, the billing subsystem 104b may use Kenan™ from CSG Systems™. The sales and/or order entry subsystem 104c may use, for example, Siebel™ from Oracle™. The network inventory management subsystem 104d may use Granite™ from Telcordia™. The human resources subsystem 104e may use JD Edwards Enterprise One™ from Oracle™ or GSA's™ Comprehensive Human Resources Integrated System (CHRIS™). Of course other business applications may be used in any of the subsystems 104. In addition, the enterprise may include other subsystems than are shown in FIG. 1, which may employ their own application specific programs.

As mentioned above, the various computing devices 108 within a given subsystem 104 communicate with each other using a language specific to the given subsystem 104. The language refers to the protocol, message format, message structure and vocabulary that are used by the applications, systems and devices within the subsystem. The language used within one subsystem may be different from the language used by another subsystem. For example, a Granite™ inventory management application use by the inventory management subsystem 104d will use a different language than the language used by a Financial Application used in the accounting subsystem 104a.

The illustrated embodiment enables communication between different subsystems by providing adapters 110 that support a common communication platform for the different subsystems. Each adapter 110 is logically located between the communication channel 106 and a subsystem 104. Each subsystem 104 may have one or more adapters 110 associated with it. The adaptors 110 perform translation operations to translate messages from a subsystem-specific format to a common language format and vice versa. In one embodiment the adapters 110 transmit and receive messages over the communication channel 106 in the common format. Each adapter 110 is operable to communicate with an application programming interface (API) that is specific to the business application used by the subsystem 104 associated with that adapter. For example, for inventory subsystem 104d that uses the Granite™ inventory management application, the corresponding adapter 110 communicates with the Granite™ API. In this manner, the specific API command signatures, parameters and protocols of each subsystem 104 are transparent to the other subsystems 104.

The translation and API interfacing capabilities of the adapters 110 are discussed in further detail below. Adapters 110 may be implemented with, for example, and without limitation, network appliances, server computers or gateways. In some embodiments, adapters 110 are configured to receive specified messages according to subscriptions. As such, a given adapter 110 may receive some or all of the messages transmitted over the communication channel 106.

The enterprise network 102 and the communication channel 106 can be composed of, for example, any combination of an Ethernet (IEEE 802.3) network or a Wi-Fi (IEEE 802.11) network. It should be understood that the invention is not limited to Ethernet or Wi-Fi. In some embodiments, the data communicated over the communication channel 106 is in the form of messages that are formed from packets or datagrams. Any given message can be sent to a particular address or to a broadcast address, whereby all subsystems can receive the message. Broadcasting messages can be particularly useful in managing business processes of the enterprise. Typically, although not necessarily, the interactions between the subsystems 104 are event-driven. For example, a subsystem 104 may take certain actions in response to an event.

A communication channel management subsystem 112 monitors and manages the communication channel 106. The communication channel management subsystem 112 typically enforces a selected message exchange pattern (MEP), enforces a security model on the communication channel 106, and can route and/or transform messages. In this regard, the communication channel management subsystem 112 may be configured with a subsystem model. This model enables the communication channel management subsystem 112 to associate business level messages from a BPMS 118 (discussed further below) with system level messages for the enterprise subsystems. Thus, for example, when the communication channel management subsystem receives a business level message from the BPMS 118, the communication channel management subsystem 112 can determine what system level messages need to be sent over the channel 106 in response to the business level message. In this fashion, subsystem level details do not necessarily need to be known to the BPMS 118, but can be transparent to the BPMS 118.

In addition, the communication channel management subsystem 112 receives and manages one or more subscriptions 114 associated with the subsystems 104. The subsystems 104 each may subscribe to messages on the communication channel 106 of particular types or pertaining to particular subjects. To illustrate, the inventory management subsystem 104d may subscribe to messages that relate to inventory. The communication channel management subsystem 112 ensures that any messages related to inventory are routed to the inventory management subsystem 104d.

In accordance with various embodiments, broadcast communication and point-to-point communication can be used. Broadcast communication typically involves one sender sending a message to many recipients or ad-hoc recipients. Point-to-point communication generally involves one sender sending a message to one recipient in a pro-form a fashion. The broadcast approach serves as the basis for asynchronous communications—which directly enables system scalability. The point-to-point approach is the basis for synchronous, deterministic communication.

In one embodiment, the communication channel 106 and the communication channel management system 112 form an enterprise service bus (ESB). One example of a commercially available ESB is Tibco's BusinessWorks™; however, the invention is not limited to this particular ESB.

With further regard to adapters 110, the adapters 110 enforce a common language on the communication channel 106. As mentioned above, each adapter 110 is operable to translate messages from the format specific to the adapter's associated subsystem 104 into a common format that is recognized by all adapters 110. Similarly, each adapter 110 is operable to translate messages received from the communication channel from the common format into the format that is specific to the adapter's associated subsystem 104. Thus, for example, the adapter 110 can translate from the common format into a message format used by an order entry application in the order entry subsystem 104c. An exemplary embodiment is illustrated in FIG. 2.

Figure 2:
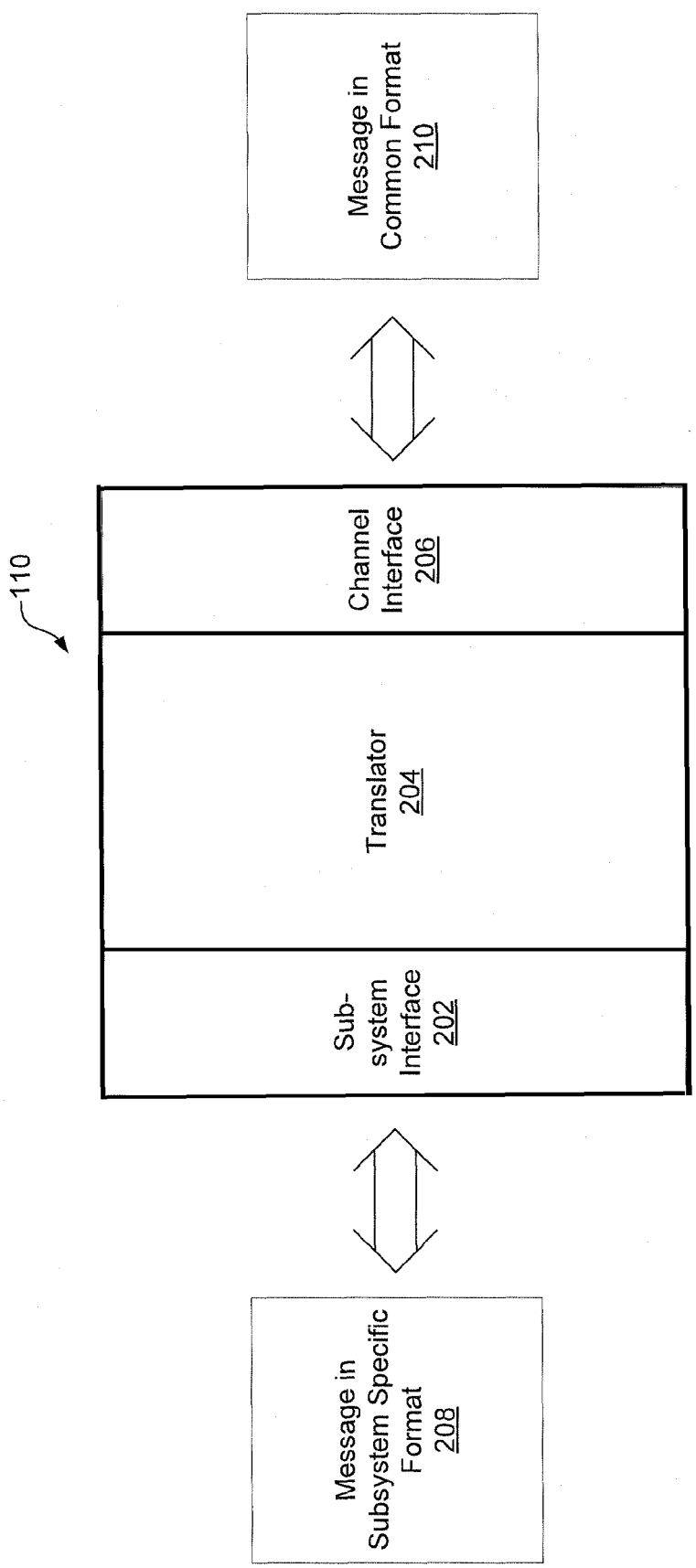
FIG. 2 illustrates an embodiment of an adapter that may be used in the operating environment of FIG. 1.

In FIG. 2 an adapter 110 includes a subsystem interface 202, a translator 204, and a channel interface 206. The subsystem interface 202 and the channel interface 206 may both include application programming interfaces for enabling application programs operating on other computers to communicate with the adapter 110. The subsystem interface 202 receives and sends messages 208 in subsystem-specific format from and to an associated subsystem in the enterprise, respectively. The subsystem interface 202 is adapted to use the API or APIs that may be specific to one or more business applications executed by the associated subsystem. Subsystem-specific formatted messages 208 sent to the subsystem may be sent to an identified server in the subsystem. The channel interface 206 receives and sends messages 210 in the common format from and to the communication channel, respectively. In one embodiment, the channel interface 206 sends the common formatted messages 210 by broadcasting them over the communication channel 106. Using the channel interface 106, the adapter 110 monitors the communication channel 106 for messages that pertain to specified subjects that are relevant to the associated subsystem or subscribed to by the associated subsystem.

The translator 204 of the adapter translates messages from the subsystem-specific format into the common format and vice versa. In one embodiment, the translator 204 receives the subsystem-specific message 208 from the subsystem interface 202, and converts the message 208 into another message 210 formatted according to the common language used on the communication channel. The common language format may be a generic format readable by all adapters 110. Similarly, the translator 204 receives the common formatted message 210 from the channel interface 206 and converts the common formatted message into another message 208 formatted according to the subsystem-specific language used within the subsystem associated with the adapter 200. In one embodiment the translator 204 translates sub-system specific formatted messages 210 into an Extensible Markup Language (XML) format. Table 1 below illustrates an exemplary common format that may be used for order entry messages:

TABLE 1

Exemplary Common Format

```
<?xml version="1.0" encoding="UTF-8"?>
<SOAP-ENV:Envelope xmlns:SOAP-
ENV="http://schemas.xmlsoap.org/soap/envelope/">
<SOAP-ENV:Body>
<ns0:billingAccountNotificationxmlns:ns0=
"http://level3/enterprise/service/customer/v1">
<ns0:context>
<ns0:source>SIEBEL</ns0:source>
<ns0:version>v1_0</ns0:version>
<ns0:correlationId>1-1OXT4</ns0:correlationId>
</ns0:context>
<ns0:billingAccount>
<ns0:billingAccountNumber>1-4ONIJ</ns0:billingAccountNumber>
<ns0:billingAccountClassType>Billing</ns0:billingAccountClassType>
<ns0:billingAccountActiveDate>2007-05-17T12:00:00Z
</ns0:billingAccountActiveDate>
<ns0:accountTaxExemptionIdentifier>N
</ns0:accountTaxExemptionIdentifier>
<ns0:billingAccountName>ST3-12</ns0:billingAccountName>
<ns0:billingAccountTypeCode>Billed</ns0:billingAccountTypeCode>
<ns0:operatingCompanyNumber>North America, LLC - L3
Comm</ns0:operatingCompanyNumber>
<ns0:currencyCode>USD</ns0:currencyCode>
<ns0:languageCode>English</ns0:languageCode>
<ns0:marketSegmentCode>N American</ns0:marketSegmentCode>
<ns0:billingAccountStatusCode>Active</ns0:billingAccountStatusCode>
<ns0:customer>
<ns0:customerNumber>1-PVSVB</ns0:customerNumber>
<ns0:customerName>Itron Inc</ns0:customerName>
<ns0:lineOfBusiness>
<ns0:lineOfBusinesDescription/>
</ns0:lineOfBusiness>
<ns0:customerAddress>
<ns0:subAddress>
<ns0:line1AddressText>1010 Atlantic Ave</ns0:line1AddressText>
<ns0:line2AddressText/>
<ns0:line3AddressText/>
</ns0:subAddress>
<ns0:city>Alameda</ns0:city>
<ns0:stateOrProvinceName>CA</ns0:stateOrProvinceName>
<ns0:postalCode>94501</ns0:postalCode>
<ns0:countyName>ALAMEDA COUNTY</ns0:countyName>
<ns0:countryName>US</ns0:countryName>
```

TABLE 1-continued

Exemplary Common Format

```
</ns0:customerAddress>
</ns0:customer>
<ns0:billingAddress>
<ns0:subAddress>
<ns0:line1AddressText> 1250 S TAMIAMI TRL</ns0:line1AddressText>
<ns0:line2AddressText/>
<ns0:line3AddressText/>
</ns0:subAddress>
<ns0:city>SARASOTA</ns0:city>
<ns0:stateOrProvinceName>FL</ns0:stateOrProvinceName>
<ns0:postalCode>34239-5103</ns0:postalCode>
<ns0:countyName>SARASOTA COUNTY</ns0:countyName>
<ns0:countryName>US</ns0:countryName>
</ns0:billingAddress>
<ns0:primaryContact>
<ns0:contactFirstName> Mark</ns0:contactFirstName>
<ns0:contactLastName> Abbott</ns0:contactLastName>
<ns0:telephoneNumberContact>720-222-3333
</ns0:telephoneNumberContact>
<ns0:emailAddressContact>mabbott@dtcc.com
</ns0:emailAddressContact>
<ns0:timeZone>GMT</ns0:timeZone>
<ns0:prefix>Mr.</ns0:prefix>
</ns0:primaryContact>
</ns0:billingAccount>
</ns0:billingAccountNotification>
</SOAP-ENV:Body>
</SOAP-ENV:Envelope>
```

The common format shown in Table 1 is accessible to any of the enterprise subsystems 104. Adapters 110 associated with the subsystems make it possible for any of the subsystems to read messages from the bus, even if the messages were not generated specifically for them. For example, the inventory management subsystem 104*d* could read an order entry message like that shown in Table 1, even though the inventory management subsystem 104*d* uses the Granite™ subsystem. For example, the adapter 110 of the inventory management subsystem 104*d* may be configured to read messages off the communication channel 106 that relate to billing, as indicated by <ns0:billingAccountNotificationxmlns: ns0="http://level3/enterprise/service/customer/v1"> shown in the common format of Table 1 above. Of course adapters 110 can be configured to read messages related to any subject or only a selected subset of subjects.

Figure 3:
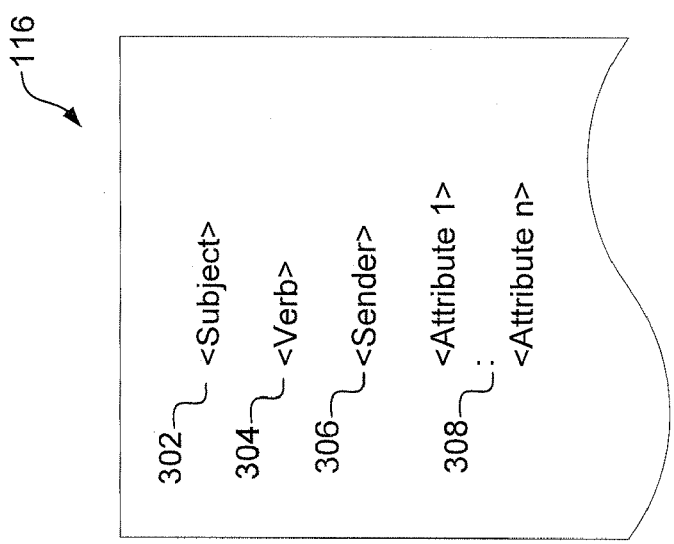
FIG. 3 illustrates and embodiment of a message in a common format that may be used in the common language of the communication channel of FIG. 1.

In one embodiment the common language of the communication channel 106 uses enterprise data objects (EDOs) 116. An exemplary embodiment of an EDO 116 is illustrated in FIG. 3. The EDO 116 is one example of a common message format. As such, for example, the information of the common format shown in Table 1 could be included in an EDO. In this embodiment the EDO 116 is an XML object that includes a number of fields.

In another embodiment, and more generally, the EDO fields include a subject field 302, a verb field 304, a sender field 306 and one or more attribute fields 308. The subject field 302 includes a brief description of the subject of the EDO 116. An exemplary subject may be "Inventory". The verb field 304 indicates an action performed with respect to the subject 302. An exemplary verb may be "Reserve Cisco Router Model 7500". The sender field 306 indicates the sending party, typically one of the subsystems 104 of the enterprise. The attributes 308 may further clarify the message. By way of example, but not limitation, attributes may include parameters, provide alternatives, indicate a time deadline for response, or indicate a manner of response. For example, continuing with the present example, an alternative may be "Reserve Cisco Router Model 7200."

In one embodiment, the format of EDOs corresponds to TMF (Telemanagement Forum) standards. In this embodiment the TMF defines or sets forth guidelines for a canonical format for EDOs that are sent over the bus. Translating messages to and from the canonical format can be logically divided into two categories: syntactic translation and semantic translation. Of course, the adapter interacts with subsystem specific applications through the vendor specific APIs to facilitate the communication of translated messages to the subsystem.

A business process management system (BPMS) 118 manages the business process of the enterprise in an automated way. In general the BPMS 118 executes a business process model. During execution of the business process model, the BPMS 118 generates business level messages, which may or may not correspond or result in system level tasks to be carried out by one or more of the subsystems 104. One particular embodiment of a BPMS 118 is Savvion's Business-Manager 7.0™. The BPMS 118 uses business process models 120 that represent the business processes of the enterprise. The BPMS includes one or more interface applications 122 for use in creating and editing business process models 120 and then executing the business process models 120. In the embodiment illustrated, the BPMS includes a model editor 124 and a business process management server 126. The model editor 124 includes a user interface, whereby users in the enterprise can create and edit the business process models 120. As is discussed further below, a business process model 120 may be created or edited through a model editor 124.

In some embodiments, users with little or no special software knowledge are able to use the model editor 124, such that there is no need to rely on the Information Technology group of the enterprise whenever a change needs to be made to the model 120. In general, the business process model 120 captures the manner in which a business process should be performed. For example, tasks can be assigned to subsystems and deadlines can be specified for associated benchmarks. The business process model 120 may be specified before a business process is started, and then updated as more is learned about the business process while it is being performed or things change. For example, a rule (discussed further below) may change regarding how information must be securely stored. In such a case, management can use the model editor 124 to change the rule to satisfy the new requirement.

In some embodiments of a BPMS 118, the model editor 124 includes a graphical user interface (GUI) through which users can create the business process model 120. The user can create or edit a graphical model that can be compiled and executed. For example, through the GUI a user can drag and drop icons in a graph to create or update the business process model 120. The BPMS 118 can then execute the business process model 120.

A business process model 120 includes, for example, business rules (or rulesets) 128 and workflows 130. Business rules 128 set forth definitions or constraints related to the enterprise. For example, a business rule may be that an upper level manager must authorize purchases over $5000. Another business rule may be that contract workers cannot be hired for a particular task or in a particular subsystem. Yet another exemplary business rule may specify a certain engineering protocol must be carried out when implementing a private line network in accordance with Occupational Safety and Health Administration (OSHA) regulations. As yet another example, a rule may be that particular financial information be stored separate from other information and/or stored in a secure manner such that only authorized employees can access the information.

A workflow 130 specifies the flow of tasks and documents through a work process. The workflow 130 may specify the order in which tasks are performed and the subsystem 104 that is to carry out each task. The workflow 130 may specify that a particular document (e.g., a purchase order or invoice) or an electronic copy of the document be transmitted from one subsystem to another subsystem. For example, an order for a component may be created by an engineering subsystem and sent to the inventory management subsystem.

After the business process model 120 is created, it is compiled and executed. Execution of the business process model 120 will involve communication between the BPMS 118 and other subsystems 104 in the enterprise, and in particular the communication channel management subsystem 112. The BPMS server application 126 provides an interface for communicating with subsystems 104 and/or the communication channel management subsystem 112 over the communication channel 106 during the execution of the model 120. Among other functions, the BPMS 118 can track the business process and trigger events or tasks in the process. The BPMS 118 can also gather business process statistics and generate reports. Such reports may be particularly useful to upper level management trying to understand the business process. When transmitting messages, BPMS server 126 can broadcast messages onto the communication channel 106. In the broadcast mode, the subsystems 104 monitor for messages that concern them. For example, the subsystems 104 may use only those messages having a specified subject.

With further regard to the BPMS 118, in some embodiments the BPMS 118 sends and receives business level messages through an adapter 110. In these embodiments, the BPM server application 126 sends messages to the adapter 110 in a format specific to the BPMS 118. The adapter 110 translates the messages into a common format for broadcast over the communication channel 106. The common format may be a canonical format. When the adapter 110 of the BPMS 118 receives messages from the communication channel 118, it translates the messages into the BPMS specific format. Generally the adapter 110 of the BPMS 118 will receive all messages off the communication channel 106.

Referring more specifically to the adapters 110, in some embodiments the functionality of the adapters 110 is implemented through software that is developed by personnel associated with the corresponding subsystem. The use of adapters 110 can be appealing in some cases because the adapters 110 can be configured and implemented into the enterprise infrastructure without change (or with very little change) being made to the existing subsystem infrastructure. In other words, the adapters 110 can make a transition to a common communication platform transparent to the subsystems. However, in other embodiments the translating operations described as being performed by the adapters 110 may rather be performed by a server computer, router, or other component that is part of an existing subsystem.

When a new subsystem is added to the enterprise, it may have its own specific language and message format. As such, an adapter for the new subsystem is communicably coupled to the communication channel 106. Typically as part of an initialization process the new subsystem will get permission from the communication channel management subsystem 112 to communicate on the communication channel 106. In addition, the new subsystem will register itself (e.g., identify itself) with the BPMS 118, so that the new subsystem can be included in the business process models 120.

In another embodiment that is not shown, business processes can be managed in an Internet wide fashion. To illustrate, one or more functional business groups and/or subsystems may reside outside the enterprise but be in communication with the enterprise via the Internet. Using EDOs or another canonical message format, subsystems outside the enterprise can communicate with other subsystems. Furthermore, by using a secured transmission protocol, such as Secured Sockets Layer (SSL), the various subsystems can communicate with each other even if firewalls exist at the subsystems. In other words, a canonical message format and SSL enable both inter-enterprise subsystem and intra-enterprise subsystem communication.

Exemplary Operations

Figure 4:
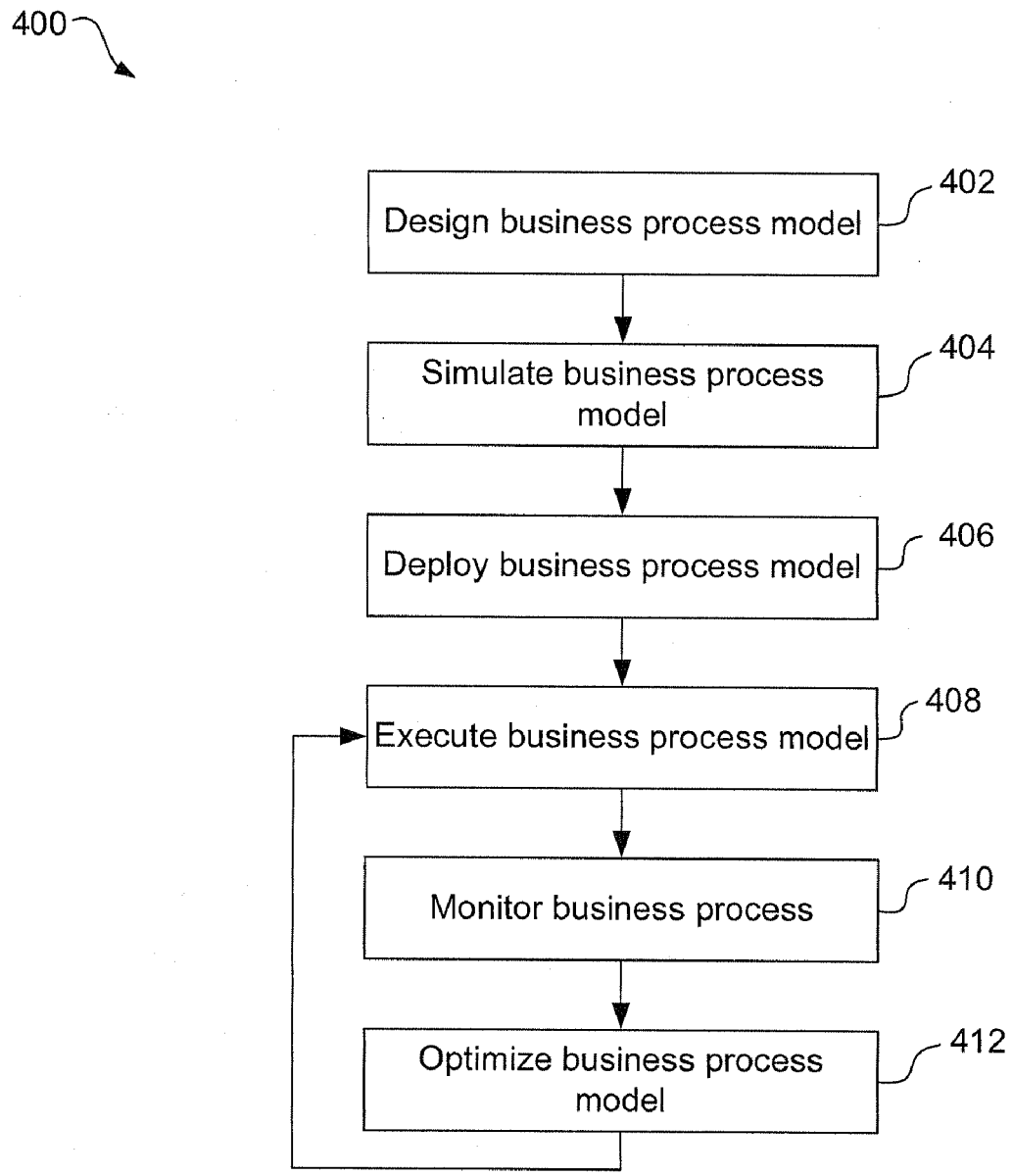
FIGS. 4-5 are flowcharts illustrating a business process management algorithm in accordance with one embodiment.

FIG. 4 is a flowchart illustrating a business process model creation, execution and optimization algorithm 400 in accordance with one embodiment. The exemplary algorithm 400 may be carried out by a BPM system, such as the BPMS shown in FIG. 1. However, the BPM algorithm 400 can be carried out by any computing system in a variety of different business environments. For example, some parts of the algorithm 400 may be carried out by the BPMS and other parts might be carried out by a communication channel management system, such as a management system for an ESB.

In a designing operation 402 a business process model is designed. In one embodiment, the business process model is designed by a user using a business process model editor. The model editor may be a graphical user interface through which the user can specify business rules, workflows or other characteristics of the business process. In a simulating operation 404 the business model is simulated. The simulating operation 404 typically occurs on a stand alone computer where messages are contained to the computer, so that the user can observe performance of the model and edit the model as necessary. In a deploying operation 406, the business process model is deployed. Deploying the business process model typically involves loading the model onto a BPMS or similar system that is in operable communication with the relevant enterprise subsystems.

Figure 5:
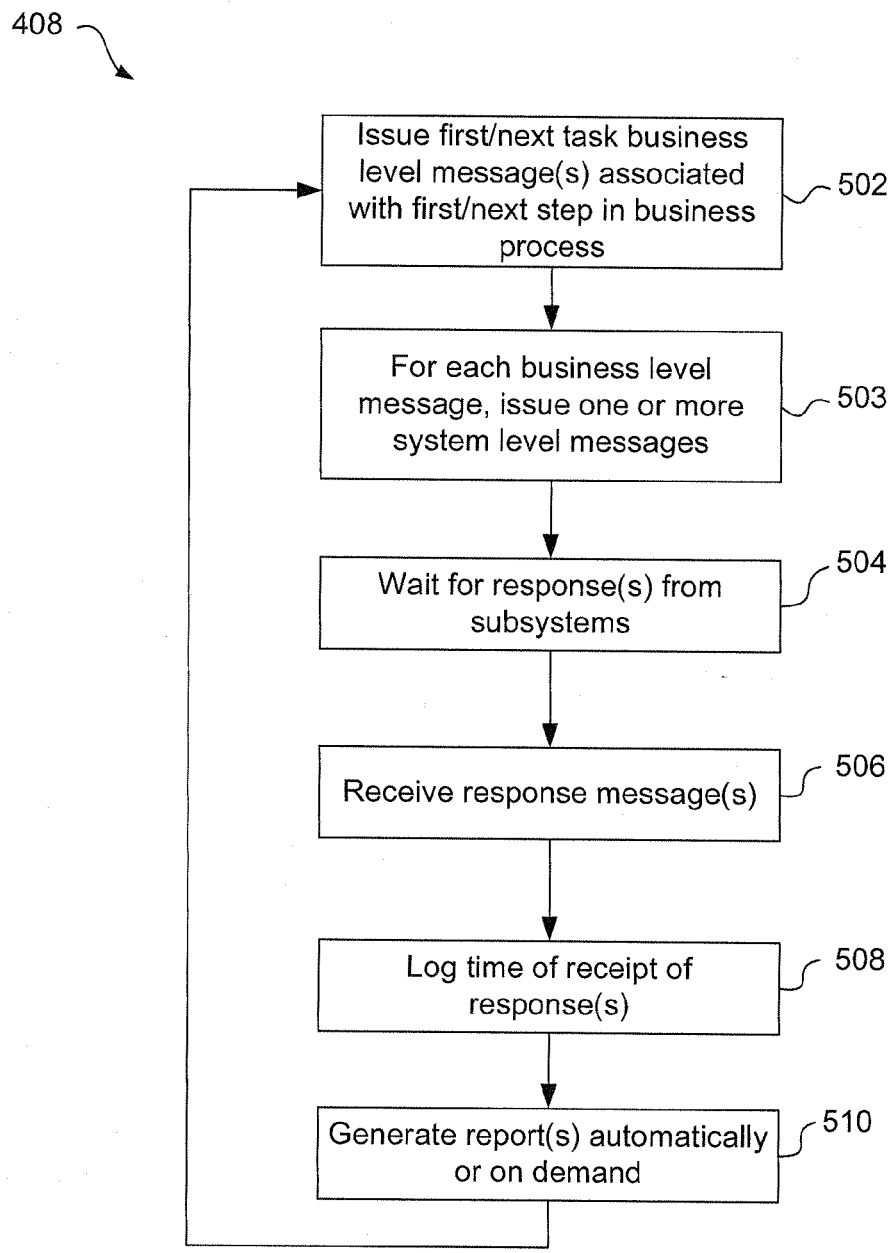

In an executing operation 408, the business model is compiled and executed. An embodiment of the executing operation 408 is illustrated in FIG. 5 and is discussed in detail below. Briefly, the executing operation 408 processes the steps specified in the business process model and performs the appropriate operations associated with those steps. A monitoring operation 410 monitors the business process to determine whether steps are occurring according to the model, or if variations are observed. The monitoring operation 410 may involve monitoring the timing of responses from subsystems in the enterprise. Sometimes subsystems perform tasks in a timely fashion and other times subsystems may not perform the tasks in a timely fashion or at all. Performance or nonperformance of tasks could indicate problems with the business model, a systemic problem within the enterprise, or something else. The monitoring operation 410 can document variations and/or discrepancies relative to the business process model.

In an optimization operation 412, the business process model is further optimized based on results of the monitoring operation 410. For example, suppose the business process model had allocated 5 days for a task step involved in ordering a business service. If during execution the task step consistently takes 3 days to complete over the course of, for example, several months, the monitoring operation 410 records the difference in time. The optimizing operation 412 may then edit the business process model to allocate 3 days for the task step. The optimizing operation 412 then deploys any changes to the business process model and the algorithm 400 continues at executing operation 408.

FIG. 5 is a flowchart illustrating a business process model execution algorithm 408 in accordance with one embodiment. In an issuing operation 502 a BPMS or similar system issues one or more business level messages associated with a first step in the business model. The issuing operation 502 involves generating task messages designating tasks associated with business level operations. The issuing operation 502 may or may not involve transmitting business level messages onto the communication channel. For example, some business level operations are carried out by issuing tasks, notifications, or commands to employees through email applications or electronic calendars. Some of the business level operations require issuing business level messages onto the communication channel. When business level messages are transmitted (e.g., broadcast) onto the communication channel, another issuing operation 503 typically issues one or more system level messages in response to each business level message.

In one embodiment the issuing operation 503 is performed by a communication channel management subsystem, such as an ESB server system (e.g., communication channel management subsystem 112, FIG. 1). In these embodiments, the communication channel management subsystem generally identifies tasks assigned to enterprise subsystems. Examples of tasks that may be embodied in system level messages (or business level messages) may be, for example, "sign off on purchase order", "implement Cisco routers", "test throughput of private line network", "perform accounting on month's receivables", "respond with order status", and so forth.

In the issuing operations 502 or 503, the business level messages and system level messages are transmitted in either a broadcast mode or to a specifically addressed subsystem over a communication channel. In one embodiment an adapter coupled to the communication channel management subsystem uses an API of the communication channel management subsystem to obtain the task messages from the communication channel management subsystem. The adapter then reformats or translates the messages into a common format readable by other adapters on the communication channel. The messages are then transmitted over the communication channel. One or more applications of one or more subsystems receive the messages and may or may not act in response to the messages. Generally, some sort of response is appropriate.

In a waiting operation 504, the communication channel management subsystem waits for response(s) from the enterprise subsystems. A receiving operation 506 receives any responses that are sent. In the receiving operation 506 the response message(s) are received in the common format used by the communication channel. The message(s) are then translated into a subsystem specific format associated with the communication channel management subsystem by the adapter module. The adapter module then sends the message(s) to the communication channel management subsystem application through the API of the communication channel management subsystem application.

A logging operation 508 logs the time of receipt of the message(s) for metric tracking purposes. The logging operation 508 may involve the communication channel management subsystem notifying the BPMS that the messages have or have not been received. A generating operation 510, which may occur at any point in the process 408, generates one or more reports using the logged message receipt times or other information. The generating operation 510 may occur automatically or on demand or both. Typically, the generating operation 510 is performed by a BPMS. When a response (or set of responses) is received from another subsystem, the next step in the business process model is typically triggered. As such, the algorithm 408 returns to the issuing operation 502 where more messages are issued as appropriate to carry out the business process model.

Exemplary Computing Device

Figure 6:
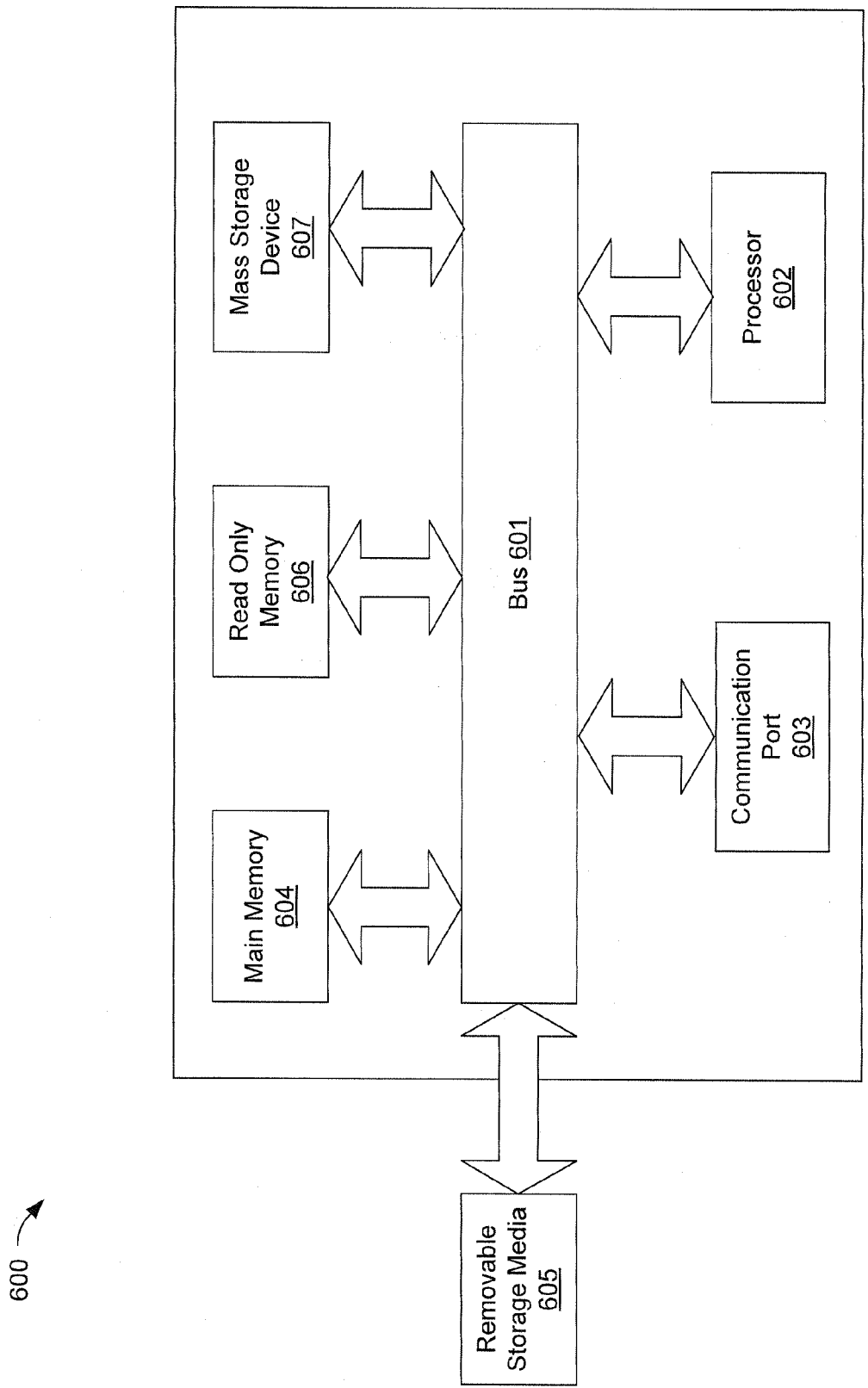
FIG. 6 illustrates a general purpose computing device upon which one or more aspects of embodiments of the present invention may be implemented.

FIG. 6 is a schematic diagram of a computing device 600 upon which embodiments of the present invention may be implemented and carried out. As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware.

According to the present example, the computing device 600 includes a bus 601, at least one processor 602, at least one communication port 603, a main memory 604, a removable storage media 605, a read only memory 606, and a mass storage 607. Processor(s) 602 can be any know processor, such as, but not limited to, an Intel® Itanium® or Itanium 2® processor(s), AMD® Opteron® or Athlon MP® processor(s), or Motorola® lines of processors. Communication port(s) 603 can be any of an RS-232 port for use with a modem based dialup connection, a 10/100 Ethernet port, a Gigabit port using copper or fiber, or a USB port. Communication port(s) 603 may be chosen depending on a network such a Local Area Network (LAN), Wide Area Network (WAN), or any network to which the computing device 600 connects. The computing device 600 may be in communication with peripheral devices (not shown) such as, but not limited to, printers, speakers, cameras, microphones, or scanners.

Main memory 604 can be Random Access Memory (RAM), or any other dynamic storage device(s) commonly known in the art. Read only memory 606 can be any static storage device(s) such as Programmable Read Only Memory (PROM) chips for storing static information such as instructions for processor 602. Mass storage 607 can be used to store information and instructions. For example, hard disks such as the Adaptec® family of SCSI drives, an optical disc, an array of disks such as RAID, such as the Adaptec family of RAID drives, or any other mass storage devices may be used.

Bus 601 communicatively couples processor(s) 602 with the other memory, storage and communication blocks. Bus 601 can be a PCI/PCI-X, SCSI, or USB based system bus (or other) depending on the storage devices used. Removable storage media 605 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Embodiments of the present invention include various steps, which will be described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Embodiments of the present invention may be provided as a computer program product, which may include a machine-readable medium having stored thereon instructions, which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed is:

1. A method for managing a business process in an enterprise comprising a plurality of business subsystems, the method comprising:
   by a computer, executing a business process model, wherein executing the business process model comprises generating a plurality of business level messages associated with business level tasks;
   in response to receiving a business level message, generating one or more system level messages associated with system level tasks to be performed by one or more enterprise subsystems, wherein the one or more enterprise subsystems comprise at least a plurality of computing systems and the one or more system level messages are in a common format that is accessible by the one or more enterprise subsystems; and
   by a computer, broadcasting the one or more system level messages over a communication channel communicably coupling the plurality of enterprise subsystems.

2. The method as recited in claim 1, wherein the communication channel is part of an Enterprise Service Bus (ESB).

3. The method as recited in claim 1 further comprising accepting subscriptions from the plurality of subsystems to subscribe to system level messages related to selected subjects.

4. The method as recited in claim 1 further comprising translating the one or more system level messages from the common format into a format that is specific to one of the plurality of subsystems.

5. The method as recited in claim 1 further comprising editing the business process model based on performance or nonperformance of tasks specified by the one or more system level messages.

6. The method as recited in claim 1 further comprising designing the business process model by specifying a plurality of rules and at least one workflow.

7. The method as recited in claim 1 wherein the common format comprises a canonical format.

8. The method as recited in claim 1 wherein the plurality of business level messages are generated by a business process model system (BPMS), and wherein generating the one or more system level messages is performed by an enterprise service bus (ESB).

9. The method as recited in claim 1 further comprising:
   translating one or more system level messages from associated subsystem specific formats into the common format;
   transmitting the one or more system level messages in the common format from the subsystems onto the communication channel.

10. The method as recited in claim 9 further comprising monitoring the communication channel for system level messages from the subsystems to analyze the business process.

11. A system for managing a business process carried out by a plurality of subsystems in an enterprise, the system comprising:
   a communication channel carrying system level messages in a generic format;
   one or more processors operable to execute at least one of:
      a plurality of business subsystems within the enterprise, each of the plurality of business subsystems comprising at least a plurality of computing systems and communicably coupled to the communication channel, wherein each business subsystem generates system level messages in a business subsystem specific format;
      a plurality of adapters, wherein each adapter is associated with one of the plurality of business subsystems, and wherein each adapter is operable to translate messages from the generic format into the associated business subsystem specific format and vice versa; and
      a business process management subsystem communicably coupled to the communication channel and operable to execute a business process model to manage the plurality of business subsystems.

12. The system as recited in claim 11 wherein communication channel comprises one or more of an Ethernet (IEEE 802.3) network and a Wi-Fi (IEEE 802.11) network.

13. The system as recited in claim 12 wherein the plurality of business subsystems comprise one or more of:
   a human resources subsystem;
   an accounting subsystem; an engineering subsystem;
   a customer relations management subsystem;
   an inventory management subsystem; and
   a billing subsystem.

14. The system as recited in claim 11 further comprising a communication channel management subsystem configured to manage communications over the communication channel.

15. The system as recited in claim 14 wherein the communication channel and the communication channel management subsystem form an Enterprise Service Bus (ESB).

16. The system as recited in claim 14 wherein the communication channel management subsystem maintains subscriptions associated with the business subsystems.

17. The system as recited in claim 16, wherein the communication channel management subsystem receives business level messages from the business process management subsystem and responsively broadcasts one or more system level messages onto the communication channel in the generic format, whereby subscribing subsystems can receive the one or more system level messages related to subjects to which the subsystems subscribe.

18. The system as recited in claim 11 wherein each of the plurality of adapter modules is selected from a group consisting of:
   an appliance;
   a server computer; and
   gateway.

19. The system as recited in claim 11 wherein messages in the generic format are in a canonical format.

20. The system as recited in claim 19 wherein the canonical format comprises:
   a subject field specifying the subject associated with the message;
   a sender field specifying the sender of the message;
   a verb field specifying an action to be taken with respect to the subject; and
   a plurality of attribute fields related to the subject and the verb.

* * * * *